United States Patent [19]

Hunter

[11] 4,407,451
[45] Oct. 4, 1983

[54] WATER PRESSURE CONTROLLED INDEXING MEANS FOR IRRIGATION SPRINKLER SYSTEM

[75] Inventor: Edwin J. Hunter, Rancho Santa Fe, Calif.

[73] Assignee: The Toro Company, San Marcos, Calif.

[21] Appl. No.: 236,850

[22] Filed: Feb. 23, 1981

[51] Int. Cl.³ .............................................. A01G 25/02
[52] U.S. Cl. .................................. 239/66; 137/624.14; 137/624.15; 137/624.2; 239/67
[58] Field of Search ............... 239/66, 67; 137/624.14, 137/624.15, 624.17, 624.2, 119

[56] References Cited

U.S. PATENT DOCUMENTS

| | | | |
|---|---|---|---|
| 3,747,620 | 7/1973 | Kah | 239/66 |
| 3,783,899 | 1/1974 | Fowler et al. | 239/66 |
| 3,797,740 | 3/1974 | Kah, Jr. | 239/66 |
| 3,853,145 | 12/1974 | Judd | 239/66 |

Primary Examiner—Andres Kashnikow
Assistant Examiner—Michael J. Forman
Attorney, Agent, or Firm—Poms, Smith, Lande & Rose

[57] ABSTRACT

A water pressure controlled indexing means for an irrigation sprinkler system in which a plurality of pilot valves, each operating an associated sprinkler or group of sprinklers is provided, has a ratchet wheel including a plurality of ratchet teeth and which is associated with one of the pilot valves to control pilot valve operation in response to ratchet position of rotation, a pawl positioned by mounting means advancing the ratchet wheel tooth by tooth increments of advancement, water pressure responsive means for moving the pawl in a forward stroke and spring biasing means for normally moving the pawl in a return stroke of a given amount when system pressure is lowered a predetermined amount which is above a given value, a tooth gap provided on the ratchet wheel for defeating continued rotation thereof while said pawl is continued in driving strokes in response to system pressure drops above said given value and override means including an additional spring means normally holding the pawl against an override retrun stroke whereby a next ratchet tooth beyond tooth gap is engaged, the overriding means being activated by a reduction in system pressure below said given amount to cause the first biasing means to over come the second biasing means to move the pawl a greater extent then the normal return stroke to thereby engage the next ratchet tooth.

18 Claims, 12 Drawing Figures

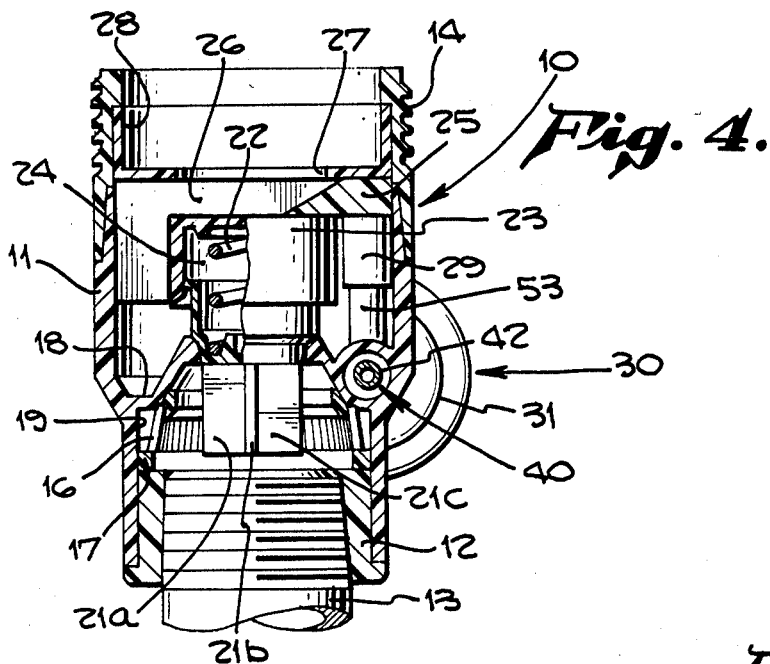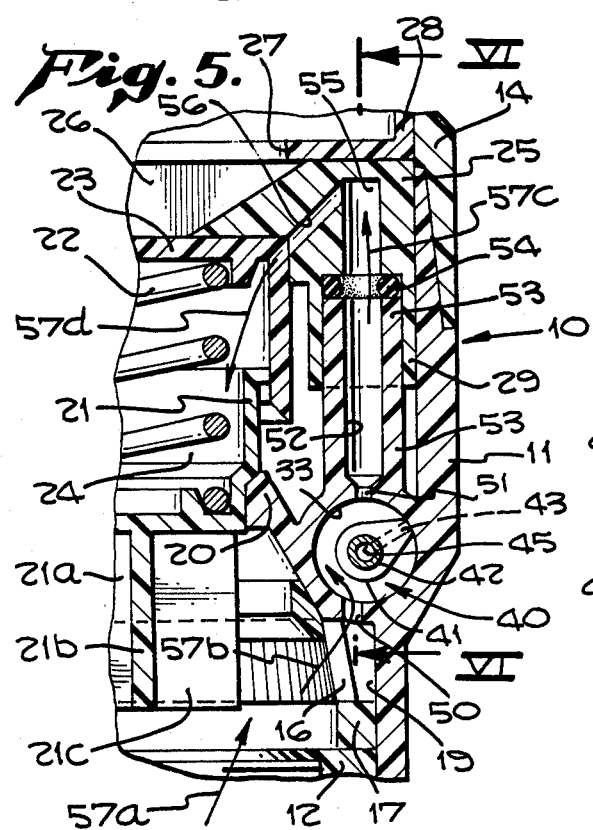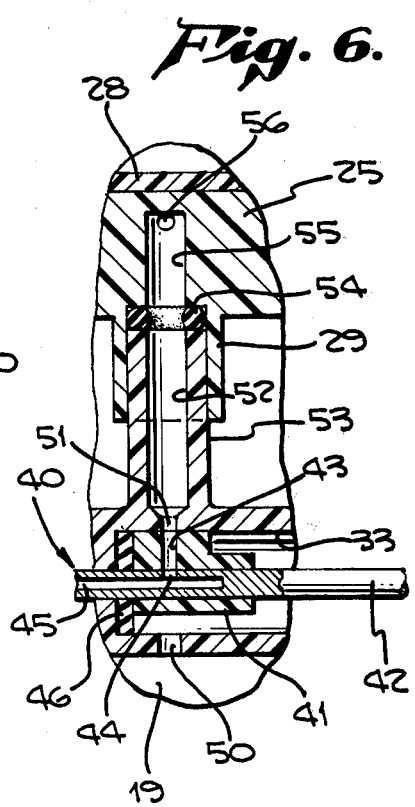

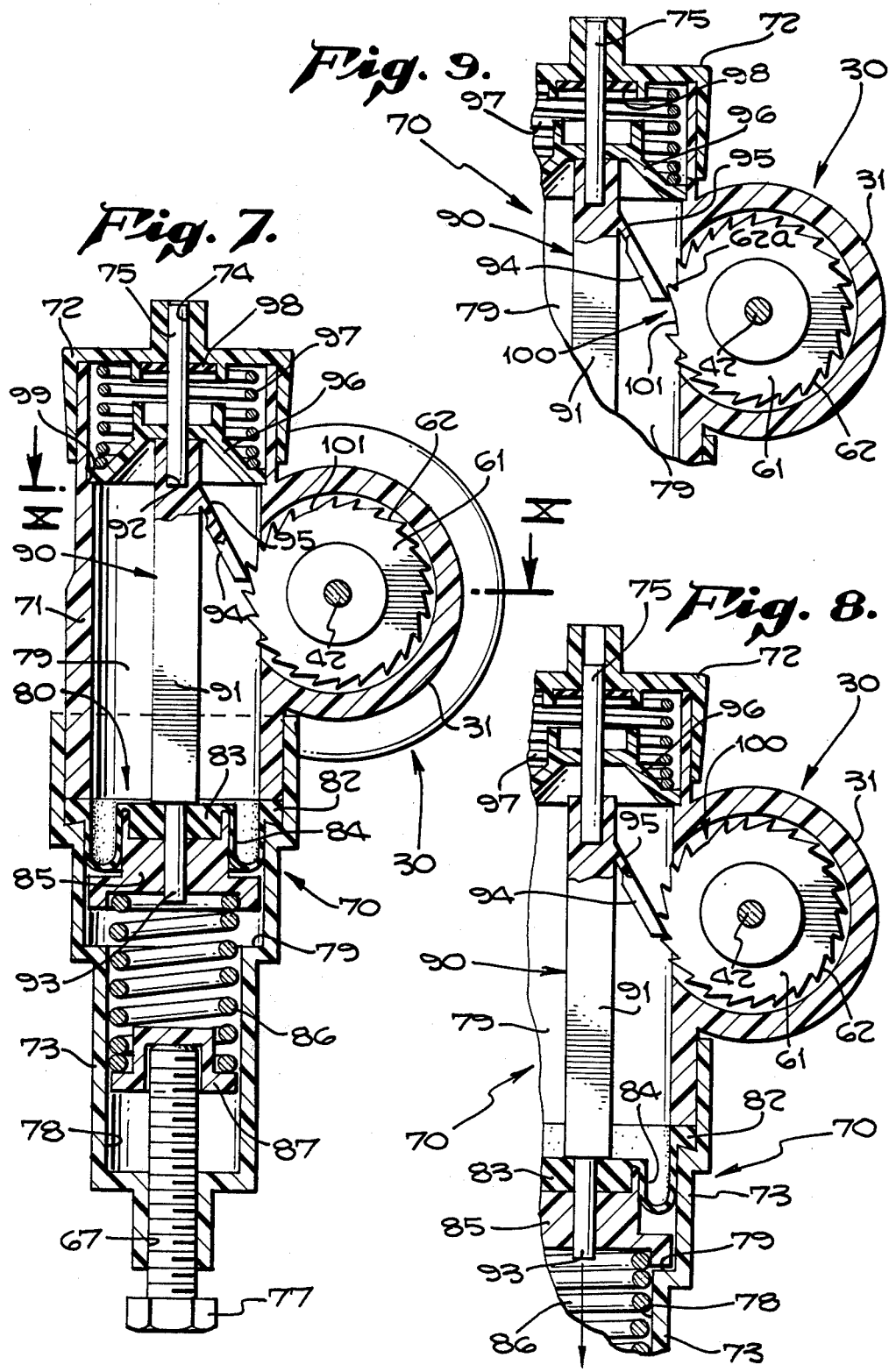

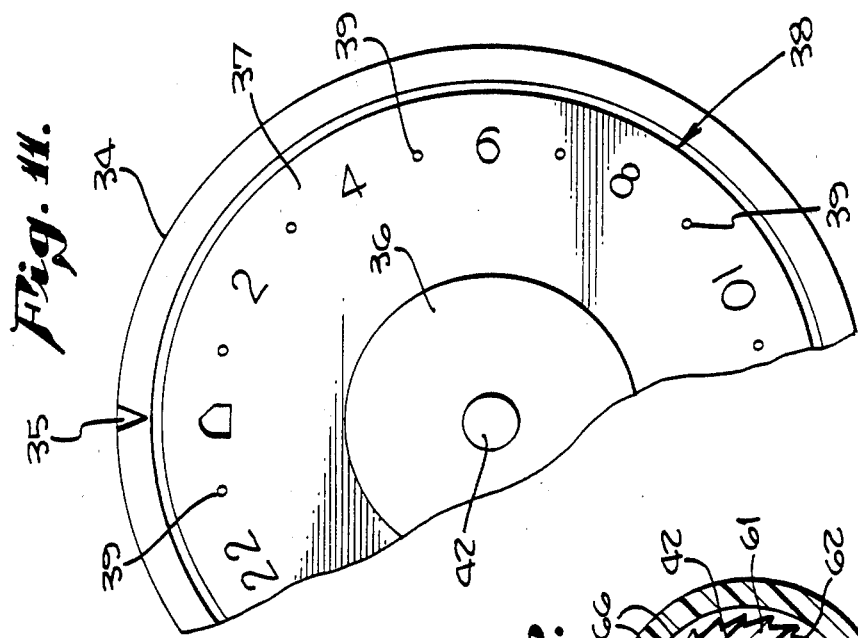
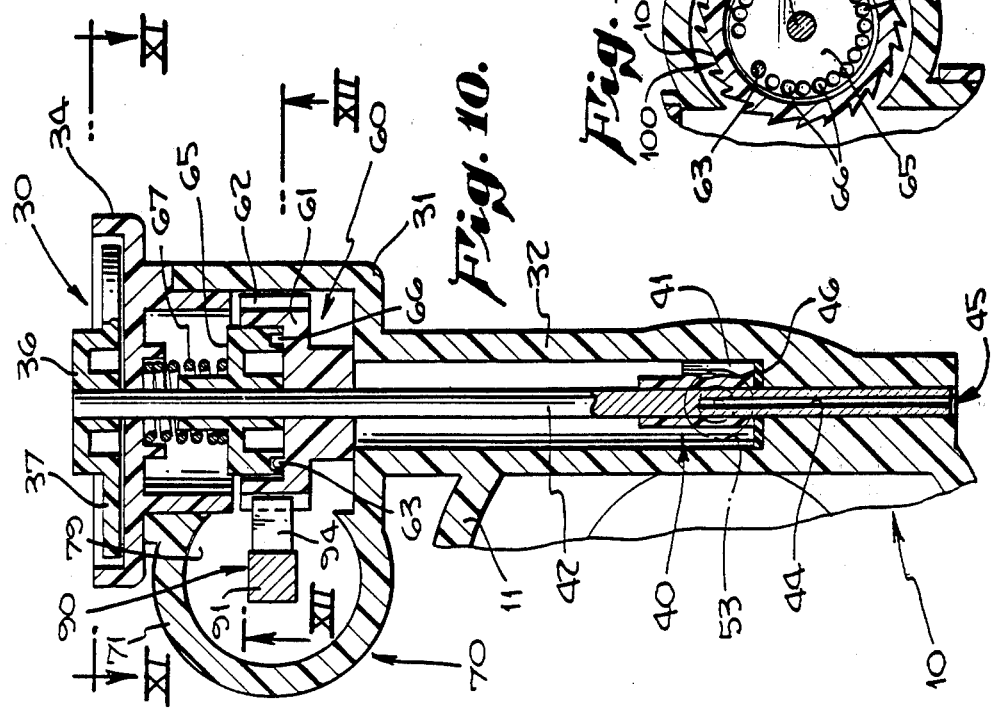

WATER PRESSURE CONTROLLED INDEXING MEANS FOR IRRIGATION SPRINKLER SYSTEM

BACKGROUND OF THE INVENTION

This invention relates in general to water pressure controlled indexing means for irrigation sprinkler systems employing a plurality of pilot valves for operating individual sprinklers, or group of sprinklers in the system, and more specifically to an improvement in such indexing means for operating each of the indexing means to a predetermined initial indexing position in response to a predetermined operation of system pressures in order to assure the correct sequential operation of each indexing means to attain a reliable and predictable operation of the sprinklers or group of sprinklers.

It is now common to provide a plurality of sprinklers or group of sprinklers whose water supply comes from a common source, frequently through common conduits with the individual sprinklers, or group of sprinklers, being selectively operated by associated pilot valves. It may be desirable to operate any individual sprinkler, or group sprinklers, only one to one and a half hours per day and it is highly desirable that a plurality of such sprinklers, or groups, be serviced from a single water conduit in order to save installation expenses which might otherwise be incurred if each sprinkler were required to have its own water supply conduit running over any substantial length of ground from a water source. Various water pressure operated systems have been employed heretofore wherein individual pilot valves are provided to operate individual sprinklers, or group of sprinklers, with the pilot valves being indexed in response to variations in system pressure. However, I have found that in these prior water pressure operating indexing systems, that it is still possible for the individual indexing means to malfunction intermittently and either fail to operate, or fail to operate in the predetermined sequence intended. It is therefore the primary object of the present invention to disclose and provide an improved water pressure controlled indexing means for irrigation sprinkler systems wherein the reliability of operation of the indexing means is improved so that a predetermined sequence of operation of a plurality of pilot valves in a sprinkler system operated by a plurality of water pressure controlled indexing means can be assured. It is a further object of the present invention to disclose and provide such an improved indexing means which will be less complicated in its construction and mode of operation then those provided heretofore, which will provide a visual indication that the system is operating correctly and will provide for manual override of the automatically operating indexing means when desired.

SUMMARY OF THE INVENTION

Generally stated, the present improvement in a water pressure controlled indexing means for irrigation sprinkler systems having a plurality of pilot valves for operating individual sprinklers, or group of sprinklers, includes the provision of means for operating each one of the indexing means to a pedetermined initial indexing position in response to a predetermined sequence of variations of water pressure in the system. Where the indexing means includes a control means advanced in incremental steps in response to predetermined variations in system operating pressures, it is contemplated within the present invention that such normal advancement of the control means be made in response to variations in system operating pressures in a range above a predetermined value and that the means for operating each of the indexing means to the predetermined initial indexing position include the provision of dwell means for automatically defeating the continued advancement of the control means while the pressure variations normally employed for advancing the control means continue. The assurance of moving each indexing means to its desired initial indexing position is thus reliably assured by providing for a repetitive operation of the control means in its normal fashion to reach such initial operating system, movement of the control means past such initial operating position being defeated by the dwell means of the present invention.

As more specifically contemplated within the present invention, the dwell means of the present invention includes the provision of a tooth gap in a ratchet wheel of a pawl and ratchet drive means for controlling the pilot valve and water pressure responsive means associated with the pawl for normally moving the pawl in a ratchet wheel drive stroke of a first amount under variations in system pressure above a given value with means for over riding this condition in response to reduction of system pressures below the given value so as to move the pawl to a next successive tooth on the ratchet wheel. It is believed that a better understanding of the present invention in water pressure controlled indexing means will afforded to those skilled in the art, and that additional advantages and objects therefore will become apparent, by the following detailed explanation of a preferred exemplary embodiment thereof. Reference will be made to appended sheets of drawings which will be first briefly described.

BRIEF DESCRIPTION OF THE DRAWINGS

FIG. 4 is a section view of the pilot valve portion of the assembly of FIG. 1 taken therein along the plane IV—IV;

FIG. 5 is a detail section view of the pilot valve portion of the assembly of FIG. 1 taken therein along the plane V—V;

FIG. 6 is a detail view of a portion of the pilot valve of FIG. 5 taken therein along the plane VI—VI;

FIG. 7 is a section view of a portion of the indexing means of the assembly of FIG. 1 taken therein along the plane VII—VII;

FIGS. 8 and 9 are detail views of the portion of the indexing means of FIG. 7 showing a normal stroke for portions of the indexing control means during variations in system operating pressures above a predetermined amount;

FIG. 10 is a section view of portions of the indexing means of FIG. 7 taken therein along the plane X—X;

FIG. 11 is a detail view of portions of the indexing means of FIG. 10 taken therein in the plane XI—XI; annd FIG. 12 is a detail section view of portion of the indexing means of FIG. 10 taken thereon along the plane XII—XII.

DETAILED DESCRIPTION OF THE PREFERRED EMBODIMENT

Figure 1:
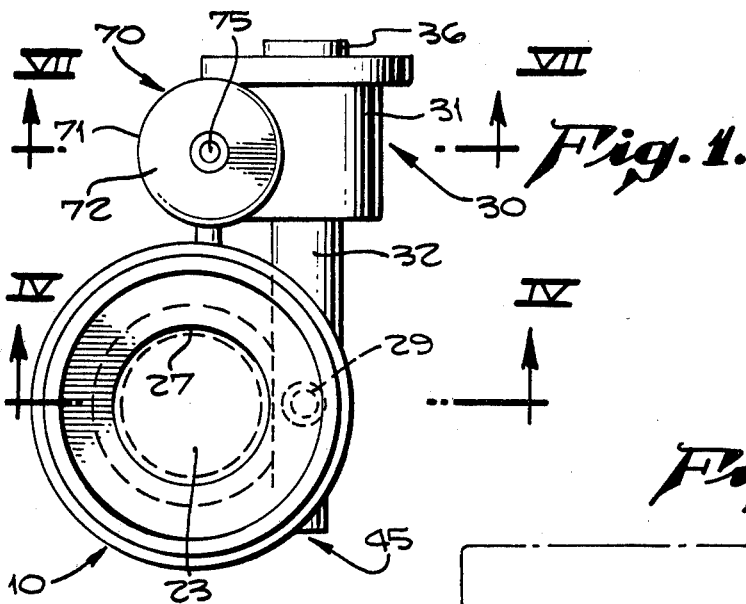
FIG. 1 is plan view of a preferred exemplary embodiment of improvement in water pressure controlled indexing means for irrigation sprinkler systems illustrated as an assembly with an associated pilot valve.
Figure 2:
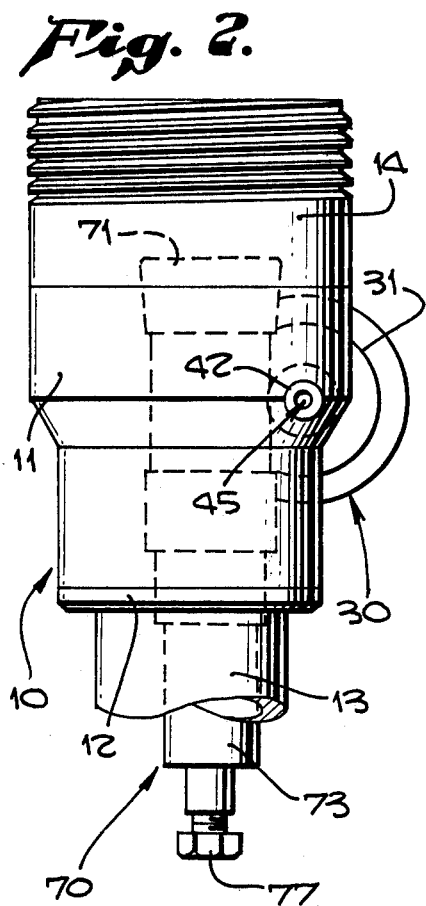
FIG. 2 is front elevational view of the assembly of FIG. 1.
Figure 3:
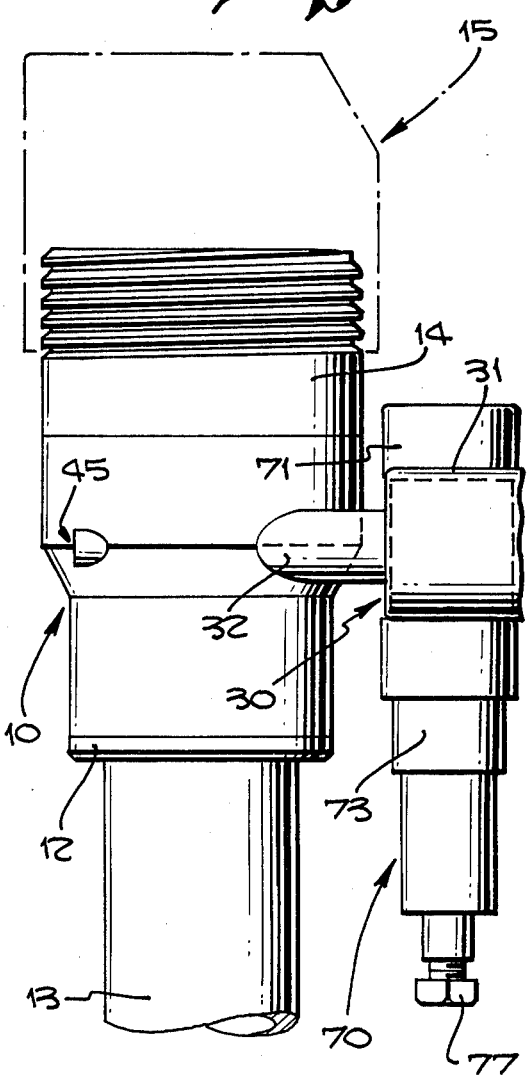
FIG. 3 is a side elevational view of the assembly of FIG. 1.

A preferred exemplary embodiment of the water pressure controlled indexing means for irrigation sprinkler system, according to the present invention, is illustrated generally at 30 in FIGS. 1 through 3 as part of an assembly with a pilot valve indicated generally at 10. The exemplary pilot valve construction, as discussed more fully hereinafter, is best seen in FIGS. 4 through 6. The water pressure controlled indexing means, as also will be discussed more fully hereinafter, includes in general an indexing means indicated generally at 60 in FIG. 10, and contained within housing 31 in FIG. 1, and an indexing control drive indicated generally at 70 in FIGS. 7 through 9 and provided within housing 71. As best seen in FIGS. 1 through 3, the control drive housing 71, indexing means housing 31 and pilot valve body 11 may all be molded in a unitary plastic molding of a material such as known as ABS plastic.

It is contemplated within the present invention that an assembly, as illustrated in FIGS. 1 through 3, would be associated with individual sprinklers, or groups of sprinklers, in an irrigation sprinkler system where it is desired to operate the individual sprinklers or group of sprinkler in a predetermined sequence of operation. Therefore, while a single assembly is being described herein, it should be understood that a plurality of such assemblies are to be incorporated into an overall system wherein each assembly is operating its associated sprinkler, or group of sprinklers, as part of an overall operating sequence for the entire system.

Considering now the exemplary embodiment of pilot valve, indicated generally at 10 in the assembly of FIGS. 1 through 3 and shown in detail FIGS. 4 through 6, the pilot valve includes a valve housing 11 having a lower threaded insert 12 adapted to threadedly engage the upper end of water stand pipe 13 to mount the pilot valve vertically with an upper threaded adapter 14 receiving a sprinkler, or connector to a group of sprinklers, such sprinkler or adapter being indicated in phantom line generally at 15 in FIG. 3. System water pressure supplied through pipe 13 is filtered in conventional manner by a screen 16 located by screen base 17 beneath integral web 18 formed in the valve body 11. The water inlet chamber 19 formed by the lower bore of body 11 directs the incoming water through a valve seat 20, formed in web 18, with a valve closure member 21 adapted to seat thereon with its guide walls or webs 21a, 21b, 21c, seen in FIGS. 4 and 5, and fourth web, not illustrated, passing through the opening of valve seat 20 to act as a guide for valve 21.

The exemplary pilot valve is normally maintained in a closed position, as illustrated in FIGS. 4 and 5, through the use of a back pressure spring 22 and means for directing inlet water pressure to a rear surface of the valve closure member 21, the valve being selectively opened by venting the back pressuring chamber behind the valve closure member. As best seen in FIG. 5, a valve cylinder 23 forms a back pressure chamber 24, cylinder 23 being positioned by molded insert 25 which has water passages past webs 26 to allow water flow past member 21 to proceed up through the outlet port 27 in retainer 28 on its way to the sprinkler or sprinkler connector indicated generally at 15 in FIG. 3.

Means are provided in the exemplary embodiment of pilot valve for venting the back pressure chamber 24 to atmosphere in order to allow opening of the pilot valve indicated generally at 10. Such means in the exemplary embodiment are indicated generally at 40 and include a vent valve member 41, a best seen in FIGS. 5 and 6, mounted in fixed relation upon index rod 42 with a vent valve port 43 aligned to rod vent port 44 to communicate with vent passage 45 opening generally at 45 through seal 46 outwardly of the assembly as seen in FIGS. 1 and 2. The vent valve member is positioned in the flow path for back pressuring valve closure member 21 so as to selectively reduce the back pressure.

Back pressure passage means in the exemplary embodiment of pilot valve include a water inlet 50 which communicates with bore 33 formed in a reduced diameter portion 32 of indexing control housing 31 and thereby to port 51 opening in valve body 11 to passage 52 formed by integral tube 53. Tube 53 fits within a coupling sleeve 29 formed integrally of insert 25 with an O-ring seal 54 positioned therebetween as seen in FIGS. 5 and 6. Sleeve bore 55 communicates with chamber vent passage 56 to provide fluid communication indicated by arrow 57a for water flow into inlet chamber 19, by arrow 57b for water flow through port 50 and chamber bore 33 around the vent valve means, indicated generally 40, through port 51, bore 52 and O-ring 54 as indicated by arrow 57c, through bore 55 and chamber vent passage 56 into back pressure chamber 24 as indicated by arrow 57d. Such inlet pressure on the rear side of valve member 21, together with the additional bias of spring 22, normally holds the pilot valve closed. From the foregoing description, it can be seen by those skilled in the art that the exemplary pilot valve can be selectively operated to an open position by rotating the indexing rod 42 to place the vent valve port 43 of member 41 in communication with back pressure chamber 24 via port 51, as seen in FIG. 6, to thereby vent the back pressure chamber 24 and to allow inlet water pressure in chamber 19 to open the valve, the inlet pressure under system operating pressures being sufficient to overcome the bias of spring 22 and to move member 21 vertically in FIGS. 4 and 5.

Manually operable means are provided in the exemplary embodiment of pressure control indexing means for setting the indexing means in a preferred orientation relative to other similar indexing means, or for selectively overriding the water powered operation of the indexing means. The pilot valve indexing control means, indicated generally at 30, includes, in the exemplary embodiment, a ratchet indexing housing 31, mentioned hereinbefore, which has an integrally formed reduced diameter housing portion 32 forming housing bore 33 within which indexing rod 42 and vent valve member 41 are positioned. A pointer hub 34 is molded integrally of housing 31, as in FIGS. 10 and 11, with a pointer notch 35 formed therein for a reference. Manual control over rod 42 is provided by the manual control knob 36 secured to the outer end of rod 42, as seen in FIG. 10, with knob 36 having an integral station indicator flange 37 which, as best seen in FIG. 11, is provided with station indicating indicia, as numbers 38 and reference dots 39. The orientation of vent valve 41 on rod 42 can be correlated with the indicia on the manual control so as to be able to predetermine when the vent valve will operate the associated pilot valve to an on condition by reference to the relative locations of the indica on manual control flange 37 to reference notch 35. Once the vent valve member 41 has been positioned manually as desired, it may thereafter be driven automatically by the water pressure controlled indexing means as hereinafter described.

The exemplary embodiment of water controlled indexing means, in accordance with the present invention, includes an indexing ratchet means indicated generally at 60, and a water pressure controlled drive, indicated generally at 70, the latter including water pressure responsive means indicated generally at 80 and associated pawl means, indicated generally at 90, driven by the water pressure responsive means as discussed hereinafter. Referring first to FIGS. 10 and 12, the indexing ratchet means, indicated generally at 60, in the exemplary embodiment includes a ratchet 61 having exterior ratchet teeth 62 and being mounted by an inner bore for free rotation upon index rod 42. Ratchet 61 is provided in the exemplary embodiment with an upside down hat section, as seen in FIG. 10, with teeth 62 formed on the outer periphery and a detent 63 upstanding on an inner horizontal surface within the central recess of the hat section. Driver member 65 is fixed to shaft 42 and is provided with a plurality of apertures 66 formed in a circular array about its underside, as seen in FIG. 12, to be selective mated with detent 63, as seen in FIG. 10. Spring 67 normally holds the driver 65 and its associated rod 42 and manual control 36 in the position illustrated in FIG. 10. As will be apparent to those skilled in the art from the foregoing description, the location of vent valve 41 may be adjusted, or initially set, by manually raising rod 42, as seen in FIG. 10, to disengage driver 65 from detent 63, against the urging of spring 67, and reposition the drive and a selected one of apertures 66 as desired, through manual operation of manual control 36. Once so positioned, rod 42 and its associated vent valve member 41 are thereafter rotated through operation of the water pressure controlled indexing means as now described.

The indexing control water pressure drive in the present embodiment is illustrated generally at 70 and, as best seen in FIG. 7, includes the provision of drive housing 71 having an indicator cap 72 at an upper end and an adjustment means cap 73 at a lower end. Upper cap bore 74 receives an indicator rod 75 which, as discussed hereinafter, provides for a visual indication of operation of the overriding means of the present invention. The lower cap 73 is provided with a threaded bore 76 in which is positioned adjustment bolt 77 having mating threads. Bolt 77 is employed for adjusting the compression of spring 86 positioned within bore 78 as discussed hereinafter. Housing 71, with its end caps 72 and 73 form a pressure chamber 79 which is exposed to system operating pressures via its communication with the interior of housing 31, which is in pressure communication through bore 33 with inlet pressure of inlet chamber 19 via port 50.

Water pressure responsive means, in the exemplary embodiment, are indicated generally at 80 and include the provision of rolling diaphragm 81 which has its outer circumferential bead 82 clamped between the lower end of housing 71 and lower or adjustment cap 73, as seen in FIG. 7. The central body 83 is of disc like configuration, is integral with the rolling web 84 of the diaphragm and is seated within an annular recess provided in piston 85. A piston spring 86 is provided for a normally biasing piston 85, and its associated rolling diaphragm 81 toward the interior of pressure chamber 79, the spring force being adjusted as desired by manually turning bolt 77 against spring end cap 87.

Pawl means in the exemplary embodiment are indicated generally at 90 and include a rod 91 having an upper end bore 92 receiving indicator rod 75 which also acts as a support guide for the upper end of rod 91. A lower extension 93 of rod 91 is positioned within a central bore of piston 85 the larger central portion of rod 91 thus being seated upon the diaphragm center portion 83 in driving relation with piston 85. A pawl or dog 94 is positioned by a flexible web 95 formed integrally of rod 91 is positioned, as seen in FIG. 7, to engage successive ones of ratchet teeth 62. The means for mounting pawl 94 for such successive engagement includes the rod 91 and its previously described driving engagement with piston 85 at its lower end, and the provision of a spring pad 96 and associated spring 97 at its upper end. A seal 98 is provided to maintain water pressure within chamber.

As particularly contemplated within the present invention, the pawl 94 is mounted by rod 91 in association with piston 85, diaphragm 81 and the associated springs 86 and 97 so as to be moved from the position of FIG. 7 in a forward stroke to the position of FIG. 8 by the introduction of water in chamber 79 under the system operating pressure. When line pressure is applied to the system for irrigation purposes, each of the water pressure controlled indexing means, in accordance with the present invention, will index in an incremental step from the position of FIG. 7 to that of FIG. 8 with ratchet wheel 61 rotating a first extent equal to approximately the width of one tooth. In an exemplary system, ratchet 61 may be provided with 23 teeth in a system having 23 stations, a station corresponding to an individual sprinkler, or group of sprinklers, to be operated by an individual indexing means of the current invention. The tensions of springs 86 and 97, together with the working diameter of piston 85 may be selected to cause a desired return stroke, for picking up a next successive tooth, to occur in response to a known pressure drop of a given amount, but above a predetermined value. Where a system operating pressures are on the order of 50 to 60 pounds, it would be desirable to have a indexing pressure drop of some 15 to 30 pounds so as to require a definite predetermine variation in the system operating pressure to cause the desired indexing. However, a particularly contemplated within the present invention, means are provided herein for operating each of the aforedescribed indexing means to a predetermined initial indexing position, in response to the predetermined sequence of variations of water pressure employed for indexing ratchet 61 and means for maintaining each such indexing means in its indexing position once it is reached. Such means in the exemplary embodiment comprise the provision of dwell means, indicated generally at 100, for automatically defeating the continued advancement of the pilot control means after it has undergone its operating sequence.

Referring now to FIG. 9, and as is particularly contemplated within the present invention, the dwell means of the present exemplary embodiment includes the provision of a tooth gap 101 on the outer periphery of ratchet 61 such that the pawl 91 is automatically defeated from continued rotation of ratchet 61 as pawl 91 is reciprocated between the full drive stroke position of FIG. 8, under full line pressure, and the normal operating return stroke position of FIG. 9. Where system operating pressures on the order of 50 to 60 pounds, by way of example, the variation in system pressure to cause movement of the pawl 94 to its normal return stroke of FIG. 9 are contemplated to be on the order of 15 to 30 pounds drop with the system pressure being maintained above about one-half of the normal operating pressure. Modulation of system pressure can be accomplished through the provision of pressure regulating valves or perhaps controlling the operating of a water pump if the system is so supplied. In any event, the present invention, for ratchet 61 will automatically cause each of the indexing means, indicated generally at 30, to run to a predeterminable initial indexing position, established by the location of gap 101, in response to normal operation of the system through the predetermined sequence of variations in system pressure. When the pawl 94 aligns with the tooth gap 101 of any individual indexing means, the pawl 94 will merely pulse between positions of FIGS. 8 and 9 under the normal variations in system operating pressure discussed and, by continuing such variations in a series of pulsations, any misaligned indexing means can be brought into the predetermined initial indexing position dictated by the location of tooth gap 101 relative to pawl 94.

As is further particularly contemplated within the present invention, means are provided for overriding the dwell means, indicated generally at 100, in order to initiate the indexing sequence for each of the indexing means of the present invention. In the present exemplary embodiment, such overriding means include the provision of the mounting and biasing means for pawl 94 so as to provide for an over return stroke of a second extent, which is greater than that illustrated in FIG. 9 in order to allow pawl 94 to engage the next successive tooth 62a as seen in FIG. 9. As discussed hereinbefore, on a forward power stroke for pawl rod 91, as seen in FIG. 8, the piston 85 will bottom out on shoulder 79 of housing cap 73 in rotating ratchet 61 a predetermined incremental advancement. With a variation in water pressure within chamber 79 of a predetermined amount, above a given value, spring 86 will act against the reduced pressure in chamber 79 to move rod 91 from the position of FIG. 8 to that of FIG. 9 wherein the upper end of rod 91 abuts spring pad 96 whose position against shoulder 99 is maintained by spring 97. When it is desired to restart an operating sequence for all of the indexing means, by overcoming the dwell occasioned by pawl 94 pulsing in the area of tooth gap 101, a reduction in system pressure is effected to a zero value, or some amount sufficiently below the aforesaid given value, in order to allow the force of spring 86 to act against either a zero pressure in chamber 79, or such predetermined lower value therefore, so as to overcome the bias of spring 97 and move pawl 94 more vertically in FIG. 9 to get behind tooth 62a and allow start of the next sequence. Such extended or overreturn stroke for pawl 94 is accompanied by a protrusion of the indicator rod 75 out of indicator cap 72 giving a visual indication that the indexing means has been successfully operated to such overriding position preparatory to initiation of the next sequence of operation of various indexing means and their associated pilot valves.

Having thus described an exemplary embodiment of water pressure controlled indexing means for an irrigation sprinkler system in accordance with the present invention, it should be understood by those skilled in the art that various modifications, adaptations, and alternative embodiments thereof can be made within the scope of the present invention which is defined by the following claims.

I claim:

1. In an irrigation sprinkler system having a plurality of pilot valves, each operating an associated sprinkler or group of sprinklers, and a plurality of water pressure controlled indexing means for operating said pilot valves, the improvement comprising the provision of:

means for operating each of said indexing means to a predetermined initial indexing position in response to predetermined sequence of variations of water pressure in said system; and dewll means operable independently of variations of water pressure in said system for automatically defeating the continued advancement of each indexing means after it has undergone its operating sequence to provide a dwell mode for said indexing means in said initial indexing position while said system operating pressure variations of the same magnitude are continued to assure the completion of each said sequence for said pilot valves.

2. The improvement in irrigation sprinkler system of claim 1 wherein each of said indexing means includes control means advanced in incremental steps in responsive to predetermined variations in system operating pressures in a range above a predetermined pressure value for normally operating each of said pilot valves through a predetermined operating sequence.

3. The improvement in irrigation sprinkler system in claim 2 wherein overriding means are provided for overriding said dwell means for initiating said predetermined operating sequence for each said indexing means.

4. The improvement in irrigation sprinkler system of claim 3 wherein indicator means are provided for giving a visually observable indication of when said override means is activated to override said dwell means.

5. The improvement in irrigation sprinkler system of claim 3 wherein said overriding means is provided so as to be activated in response to a drop in system pressure below said predetermined pressure value.

6. The improvement in irrigation sprinkler system of claim 5 wherein said control means includes a rotatable ratchet wheel whose rotary advancement controls the operation of an associated pilot valve, said wheel having a plurality of ratchet teeth, and ratchet drive means including a pawl mounted for successive driving engagement with each of said ratchet teeth and a water pressure operated piston connected to said pawl for advancing said wheel in increments corresponding to a tooth width for each variation in system operative pressures experienced by said piston.

7. The improvement in irrigation sprinkler system of claim 6 wherein said dwell means comprises the provision of a tooth gap on said ratchet wheel whereby continued rotary advancement of said ratchet wheel is defeated while said pawl is continued to be operated by said variations in system operating pressures acting on said piston.

8. The improvement in irrigation sprinkler system of claim 7 wherein mounting means are provided for mounting said pawl and piston to be normally moved a predetermined extent to advance said wheel in said increments in response to said variations in system operating pressures above said predetermined pressure valve, and said overriding means includes means for moving said pawl and piston beyond the said predetermined extent to move said pawl beyond said tooth gap to engage a next successive tooth in response to said drop in system pressure below said predetermined valve.

9. The improvement in irrigation sprinkler system of claim 1 wherein said means for operating includes;
- a ratchet wheel having a plurality of ratchet teeth and being associated with one of said pilot valves to control said pilot valve operation in response to wheel position of rotation;
- pawl means positioned for advancing said wheel by engaging successive teeth;
- water pressure operated piston means for moving said pawl in a ratchet advancing direction;
- biasing means for moving said piston and pawl in a return stroke of a first extent on drop of system pressure of a first given amount and in an over-return stroke a second extent in addition to said first extent on drop of system pressure below said given amount; and
- a tooth gap on said wheel for defeating continued rotation of said wheel for pressure drops above said given amount but allowing engagement of next successive tooth on movement of said piston and pawl of said second greater extent.

10. In a water pilot valve having a water pressure controlled indexing means for operating said valve between opened and closed conditions, the improvement comprising the provision of:
- means for operating said indexing means to a predetermined initial indexing position in response to a predetermined sequence of variations of water pressure supplied to said valve from a source thereof; and
- dwell means operable independently of variations of water pressure in said system for automatically defeating the continued advancement of said indexing means after it has undergone its operating sequence to provide a dwell mode for the indexing means in said initial indexing position while continued pressure variations of the same magnitude may occur in the water pressure supplied to said valve.

11. The improvement in pilot valve of claim 10 wherein said indexing means includes control means advanced in incremental steps in response to predetermined variations in water pressures supplied to said valve in a range above a predetermined pressure value.

12. The improvement in pilot valve of claim 11 wherein overriding means are provided for overriding said dwell means to allow continued advancement of the indexing means.

13. The improvement in pilot valve of claim 12 wherein indicator means are provided for giving a visually observable indication of when said override means is activated to override said dwell means.

14. The improvement in pilot valve of claim 13 wherein said overriding means is provided so as to be activated in response to a drop in system pressure below said predetermined pressure value.

15. The improvement in pilot valve of claim 14 wherein said control means includes a rotatable ratchet wheel whose rotary advancement controls the operation of the pilot valve, said wheel having a plurality of ratchet teeth, and ratchet drive means including a pawl mounted for successive driving engagement with each of said ratchet teeth and a water pressure operated piston connected to said pawl for advancing said wheel in increments corresponding to a tooth width for each variation in water pressure experienced by said valve.

16. The improvement in pilot valve of claim 15 wherein said dwell means includes the provision of a tooth gap on said ratchet wheel whereby continued rotary advancement of said ratchet wheel is defeated while said pawl is continued to be operated by variations in water pressures acting on said valve.

17. The improvement in pilot valve of claim 16 wherein mounting means are provided for mounting said pawl and piston to be normally moved a predetermined extent to advance said wheel in said increments in response to said variations in system operating pressures above said predetermined pressure value, and
- said overriding means includes means for moving said pawl and piston beyond said predetermined extent to move said pawl beyond said tooth gap to engage a next successive tooth in response to said drop in water pressure below said predetermined value.

18. The improvement in pilot valve of claim 10 wherein said means for operating includes:
- a ratchet wheel having a plurality of ratchet teeth and being associated with said pilot valve to control said pilot valve operation in response to wheel position of rotation;
- pawl positioned for advancing said wheel by engaging successive teeth;
- water pressure operated piston means for moving said pawl in a ratchet advancing direction;
- biasing means for moving said piston and pawl in a return stroke of a first extent on drop of water pressure of a first given amount experienced by said valve and in an over return stroke of a second extent in addition to said first extent on drop of water pressure experienced by said valve below said given amount; and
- a tooth gap on said wheel for defeating continued rotation of said wheel for pressure drops above said given amount but allowing engagement of a next successive tooth on movement of said piston and pawl of said second greater extent.

* * * * *